United States Patent [19]

Geuskens et al.

[11] Patent Number: 4,808,470

[45] Date of Patent: Feb. 28, 1989

[54] HEATING ELEMENT AND METHOD FOR THE MANUFACTURE THEREOF

[75] Inventors: Georges Geuskens; Robert Deltour, both of Brussels; Thierry Vallier, Court-St-Etienne, all of Belgium

[73] Assignee: Compagnie Internationale de Participation et D'Investissement Cipart S.A., Luxembourg

[21] Appl. No.: 58,312

[22] Filed: Jun. 5, 1987

[30] Foreign Application Priority Data

Jun. 6, 1986 [BE] Belgium ................................ 216753

[51] Int. Cl.[4] ............................................ B32B 15/08

[52] U.S. Cl. .................................. 428/323; 428/340; 428/368; 428/378; 428/408; 428/447; 428/448; 428/450

[58] Field of Search ................ 428/323, 367, 378, 408

[56] References Cited

U.S. PATENT DOCUMENTS

| | | | |
|---|---|---|---|
| 4,250,398 | 2/1981 | Ellis et al. | 428/323 X |
| 4,303,735 | 12/1981 | Kehrer et al. | 428/368 X |
| 4,320,170 | 3/1982 | Findlay | 428/323 X |
| 4,439,485 | 3/1984 | Takemura et al. | 428/323 |
| 4,520,067 | 5/1985 | Harris et al. | 428/323 X |
| 4,548,862 | 10/1985 | Hartman | 428/323 |
| 4,678,701 | 7/1987 | Pennington et al. | 428/323 X |

*Primary Examiner*—George F. Lesmes
*Assistant Examiner*—M. A. Katz
*Attorney, Agent, or Firm*—Sughrue, Mion, Zinn, Macpeak, and Seas

[57] ABSTRACT

This invention relates to a heating element and to a method for the manufacture thereof.

The heating element comprises (1) at least one electrically insulating support sheet, preferably a sheet made of mica or of glass, which is stable at the temperature of use of the element, (2) an electrically conductive layer applied on one face of the support sheet and consisting of a thermohardened synthetic resin which is stable up to a temperature of about 500° C. and in which particles of carbon black are dispersed so as to cause the resin layer to be electrically conductive, and (3) two metallic conductors in contact with said layer and parallel to each other, said metallic conductors being intended to be connected to a source of electric power.

The method for manufacturing the heating element comprises the steps of (1) coating a face of an electrically insulating support layer which is stable at the temperature of use, with an electrically conductive layer of a resin which is soluble in organic solvent(s) and which is stable up to a temperature of about 500° C. and in which particles of carbon black are dispersed and (2) connecting to said layer of resin two metallic conductors which are substantially parallel to each other.

4 Claims, 1 Drawing Sheet

HEATING ELEMENT AND METHOD FOR THE MANUFACTURE THEREOF

PRIOR ART

It is known that the addition of a sufficient amount of carbon black to a normally insulating polymer may cause this polymer to be electrically conductive. This is disclosed in a recent book "Carbon Black-Polymer Composites", edited by E. K. Sickel, M. Dekker, New York, 1982. Various applications of this property have been developed for the manufacture of heating elements, namely self regulating heating ribbons. However these applications are limited to temperatures of about 150° C.

BRIEF DESCRIPTION OF THE INVENTION

An object of this invention is a heating element which is capable of being submitted to much higher temperatures, for example temperatures of about 450° C.

According to this invention, the heating element comprises (1) at least one electrically insulating sheet which is stable at the temperature of use of the element, (2) an electrically conductive layer applied on one face of the support sheet and consisting of a thermohardened synthetic resin which is stable up to a temperature of about 500° C. and in which particles of carbon black are dispersed so as to cause the resin layer to be electrically conductive, and (3) two metallic conductors in contact with said layer and parallel to each other, said metallic conductors being intended to be connected to a source of electric power.

According to a feature of the invention, the heating element comprises two support sheets of the same nature or of different natures, between which said electrically conductive resin layer is sandwiched.

In one embodiment of the heating element according to the invention, the resin layer is a cross-linked silicone layer containing about 1 to 20% by weight and, preferably, 7 to 13 by weight of particles of carbon black, with respect to the dry resin.

The support sheets of the heating element according to the invention are preferably sheets of mica or glass.

The heating element according to the invention may have various shapes and dimensions; for example, it may have a square or rectangular shape, or even a curved shape.

This invention relates also to a method for the manufacture of a heating element, said method comprising the steps of (1) coating a face of an electrically insulating support layer which is stable at the temperature of use, with an electrically conductive layer of a resin which is soluble in organic solvent(s) and which is stable up to a temperature of about 500° C. and in which particles of carbon black are dispersed and (2) connecting to said layer of resin two metallic conductors which are substantially parallel to each other.

In a particular embodiment of the method according to the invention, a cross-linkable silicone is dissolved, preferably at room temperature, in at least one organic solvent, particles of carbon black are uniformly dispersed into the resin solution, at least one layer of the resin solution loaded with particles of carbon black is applied on one face of the support sheet, two metallic conductors are applied onto the resin layer so as to be substantially parallel to each other and the resin is cross-linked.

A second support sheet coated with one or more layers of the resin solution loaded with carbon black particles may be applied on the resin layer of the first support sheet so as to cause the resin layers carried by the two support sheets to be in contact with each other.

DETAILED DESCRIPTION OF THE INVENTION

Figure 1:
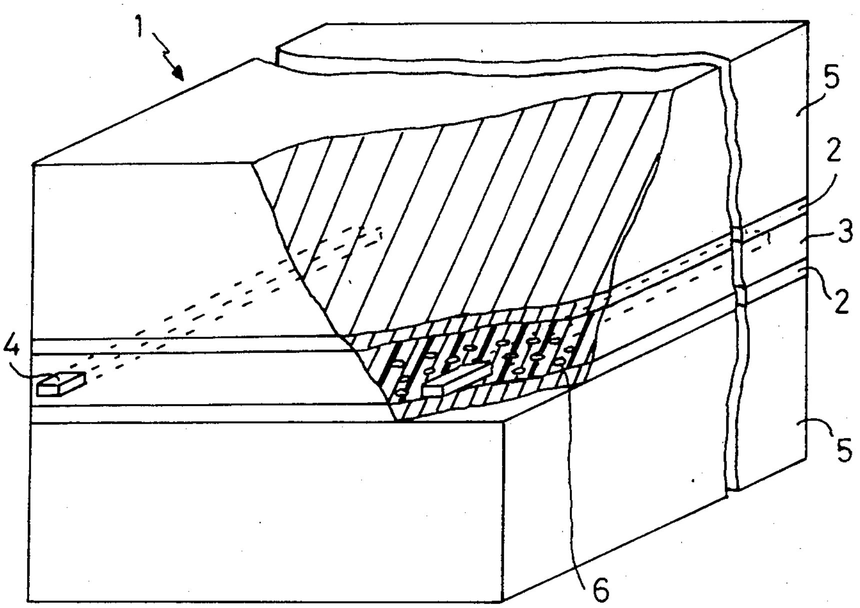
Figure 2:
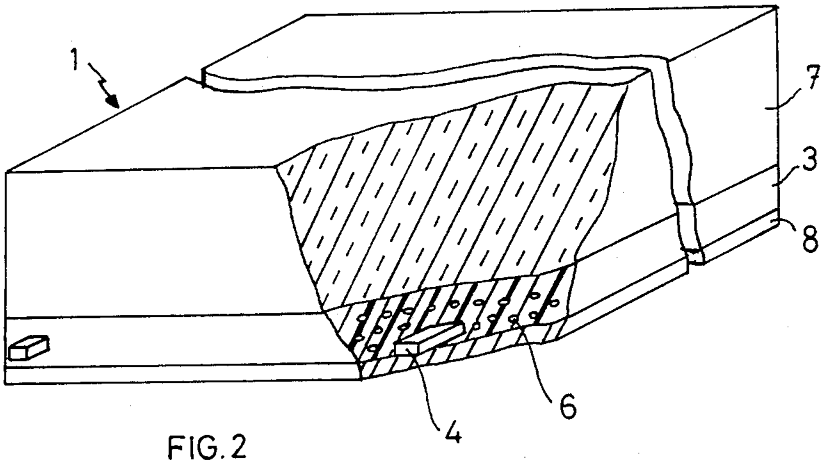

Other features and details of the heating element and of the method for the manufacture thereof will appear from the following description of FIGS. 1 and 2 of the attached drawings which show at a very large scale heating elements in perspective (with partial section), as well as from the following examples describing the manufacture of heating elements.

FIG. 1 is a perspective view (with partial section) of a heating element 1 comprising:

a support sheet 2 which is made of an electrically insulating material and which is stable at the temperature of use of the heating element;

a layer 3 of a synthetic resin which is stable up to a temperature of about 500° C., and two metallic conductors 4 which are in contact with said layer 3, these conductors being substantially parallel to each other. These conductors 4 are to be connected to a source (not shown) of electric power.

In the preferred embodiment shown in FIG. 1, the heating element 1 comprises two support sheets 2 which are electrically insulating and are stable up to the temperature of use of the heating element 1, the layer of resin 3 being placed between these two sheets 2.

The outer faces of these support sheets may advantageously be covered by a metal plate 5 having a thickness of, for example, 1 mm. One of the outer faces of these support sheets may also be covered by a thermally insulating plate, for example an asbestos cement plate.

The support sheets 2 are preferably made of mica or glass. The thickness of these sheets 2 may, for example, be of 0.2 to 1.5 mm or more.

The synthetic resin in which are dispersed conductive particles 6 such as carbon black aggregated particles, for example of less than 0.25 micron, is a resin which must be stable up to about 500° C. and which adheres closely to the support sheet(s) 2. This resin is preferably a cross-linked silicone resin.

The resin layer 3 may contain 1 to 20% by weight, preferably 7 to 13% by weight of carbon black particles, with respect to the dry resin.

The metallic conductors 4 are preferably conductive wires or tapes made, for example, of copper or brass.

One or more layers of rcsin may be applied on the support sheet, so that the thickness of each layer has a weight of 0.01 to 0.1 and preferably of 0.02 to 0.05 gram per $cm^2$ of the surface of the resin-coated support sheet.

The square resistance of a heating element 1, i.e. the resistance measured between two metallic parallel conductors forming the sides of a square, is preferably comprised between 40 and 400 ohms, so that the temperature of use of the heating element may reach 450° C., when a tension of 220 volts is applied between the two conductors 4.

The thermally stable resin may be a thermohardening polyimide, a polystyryl pyridine or an epoxy imide resin, but is preferably a silicone resin or an organopolysiloxaone.

The preferred silicone resins are those of the following formula (I):

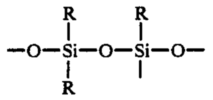

(I)

in which R represents an alkyl or aryl group.

In a particularly advantageous embodiment of the invention, the resin is a phenylsilicone or polyphenylsilsesquioxane resin which adheres exceptionally well to glass or mica. Moreover, this phenylsilsesquioxane resin is soluble in organic solvents at room temperature, so that it can be easily applied on the suppot sheet(s) 2; it is also cross-linkable so as to form a hard resin which is stable up to a temperature of about 500° C.

The heating element 1 shown in FIG. 2 is similar to that of FIG. 1, except that the resin layer 3 is placed between an electrically insulating sheet 7 made of glass of the thermal glass type such as "Pyrex" and an electrically insulating sheet 8 made of mica, for example the so-called mica paper.

The method for the manufacture of a heating element according to the invention comprises the following steps:

a thermostable resin, such as a silicone resin, is dissolved in a solvent, such as benzene, toluene, xylene and mixtures thereof or N-methylpyrrolidone;

electrically conductive particles of carbon black preferably of the superconductive type are dispersed in the solution of resin, these particles being preferably hollow particle aggregates of carbon black having a diameter of about 0.2 microns, such as the commercial products called "Ketjenblack EC" sold by AKZO (The Netherlands), "Black-pearls 2000" sold by CABOT (U.S.A.) and "Philblack XE-2" sold by PHILLIPS PETROLEUM (U.S.A.);

one or more layers of the solution of resin loaded with conductive particles are applied on one face of an electrically insulating support sheet, such as a mica paper sheet, for example the product "Cogemicanite 505.3" sold by COGEBI (Belgium);

the film(s) or layer(s) of resin applied on the support sheet are dried by evaporation of the solvent(s);

two metallic conductors are placed on the resin film so as to be parallel to each other;

the resin film is covered with a second electrically insulating support sheet, for example made of glass or mica paper, and the assembly is heated, for example at 200° C. and possibly under pressure, so as to cause the crosslinking of the resin layer sandwiched between the support sheets.

The second support sheet may be coated with a resin layer before applying it on the resin layer which is connected to the two metallic conductors and which is carried by the first support sheet, so that the two resin layers are superimposed and glued together.

The resin content of the solution is adjusted so that said solution can be easily laid on the support sheet as a uniform film, for example by spraying or by means of a brush or roller. The resin content of the solution of resin in organic solvent(s) may reach 50% by weight, but is preferably comprised between 10 and 25% by weight.

EXAMPLE 1

The solution of "805" silicone resin sold by DOW CORNING (U.S.A.) was diluted at room temperature in a solvent consisting of a mixture of xylene and toluene. The obtained solution contained 15% by weight of resin.

7% by weight of Ketjenblack EC with respect to the dry resin were dispersed in the solution. This solution was then applied on a mica paper support sheet Cogemicanite 505.3 so as to obtain after drying a weight of resin of 0.05 g per $cm^2$ of the support sheet.

After placing two copper wires substantially parallel to each other on the resin film, the latter was covered with another mica paper sheet and the assembly was heated at 200° C. during one hour.

The heating element had a square resistance of 400 ohms.

A heating test made with this element sandwiched between two sheets made of steel having a thickness of 1 mm showed that a temperature of 60° C. could be reached when the two copper wires were connected to an electric power source of 220 volts.

EXAMPLE 2

Using the method described in Example 1, a solution containing 20% by weight of "805" resin of DOW CORNING was loaded with Ketjenblack EC so as to obtain a carbon black content of 10% by weight with respect to the dry resin. After applying this solution on a mica paper support sheet and drying of the applied resin layer(s), the resin layer(s) had a weight of 0.03 gram per $cm^2$ of support sheet.

The obtained heating element has a square resistance of 100 ohms. When it was placed between two metal plates, a temperature of 200° C. was reached with a power source of 220 volts.

EXAMPLE 3

Using the method described in Example 1, a solution of organic solvents containing 15% by weight of "Baysilone P850" silicone resin (BAYER - Western Germany) was loaded with Ketjenblack EC so as to obtain a carbon black content of 10% by weight with respect to the dry resin. This solution was applied on a mica paper support sheet so as to obtain after drying a weight of 0.04 gram of resin per $cm^2$ of the support sheet.

The heating element had a square resistance of 80 ohms.

When this element was placed between two metal plates, a temperature of 265° C. was reached with a power source of 220 volts.

EXAMPLE 4

Using the method described in Example 1, a solution containing 20% by weight of "Baysilone P850" silicone resin was loaded with Ketjenblack EC so as to obtain a carbon black content of 10% by weight with respect to the dry resin.

This solution was applied on two mica paper support sheets.

After drying, the two resin layers were superimposed and glued together. The square resistance of this element was of 45 ohms.

When this element was placed between two metal plates, a temperature of 400° C. was reached with a power source of 220 volts.

EXAMPLE 5

A heating element was manufactured as described in Example 1, except that support sheets made of glass were used.

This heating element had similar properties to these of the heating element of Example 1.

EXAMPLE 6

Example 1 was repeated, except that one support sheet was made of glass.

The present invention is not limited to the here above described examples.

Thus, other electrically insulating support sheets which are stable at the temperatureoof use of the heating element, such as support sheets made of crosslinked silicone resin may be used instead of support sheets made of mica paper or glass.

Moreover, the cross-linking of the resin loaded with conductive particles may necessitate several thermal treatments. For example, the polystyryl pyridine which has a high thermal reistance must be submitted to a baking at 200° C. during one hour, to a baking at 200° C. and under pressure (5 to 10 bars) during two hours and then to a baking at 200° C. or 300° C. during several hours.

Of course, electric power having a voltage different from 220 volts may be used.

The heating element according to the present invention may be used in electrical household appliances such as toasters, radiators, etc . . . and in many industrial applications.

What we claim is:

1. A heating element which comprises (1) at least one electrically insulating support sheet which is stable at the temperature of use of the element, (2) at least one electrically conductive layer applied on one face of the support sheet and consisting of a thermohardened synthetic silicone resin which is stable up to a temperature of about 500° C., which is soluble in organic solvents before it is thermohardened and in which hollow particles of carbon black of less than 0.2 microns are dispersed so as to cause the resin layer to be electrically conductive, said conductive layer being obtained from a solution containing at least one of said organic solvent, the synthetic silicon resin before it is thermohardened and the hollow particles and (3) two metallic conductors in contact with said layer and parallel to each other, said conductors being suitable for connection with a source of electric power, said conductive layer having a square resistance from 40 to 400 ohms, the weight of said conductive layer being comprised between 0.01 and 0.1 gram per $cm^2$ of the surface of the resin-coated support sheet.

2. A heating element according to claim 1, in which said conductive layer contains about 1 to 20% by weight of hollow particles of carbon black with respect to the dry resin.

3. A heating element according to claim 1, in which said conductive layer contains 7 to 13% by weight of hollow particles of carbon black with respect to the dry resin.

4. A heating element according to claim 1, in which the weight of said conductive layer is comprised between 0.02 and 0.05 gram per $cm^2$ of surface of the support sheet.

* * * * *

UNITED STATES PATENT AND TRADEMARK OFFICE

CERTIFICATE OF CORRECTION

PATENT NO. : 4,808,470

DATED : February 28, 1989

INVENTOR(S) : Georges Geuskens, Robert Deltour and Thierry Vallier

It is certified that error appears in the above-identified patent and that said Letters Patent is hereby corrected as shown below:

[73] Assignee: COMPAGNIE INTERNATIONALE DE PARTICIPATION ET D'INVESTISSEMENT CIPARI S.A. L-Luxembourg (Great Duchy of Luxembourgh)

Signed and Sealed this

Twenty-third Day of January, 1990

*Attest:*

JEFFREY M. SAMUELS

*Attesting Officer* *Acting Commissioner of Patents and Trademarks*